US012340148B2

(12) United States Patent
Bao

(10) Patent No.: US 12,340,148 B2
(45) Date of Patent: Jun. 24, 2025

(54) METHOD AND DEVICE FOR VOICE INPUT USING HEAD CONTROL DEVICE

(71) Applicant: JRD COMMUNICATION (SHENZHEN) LTD., Guangdong (CN)

(72) Inventor: Zhuijun Bao, Guangdong (CN)

(73) Assignee: J RD COMMUNI CATI ON ( SHENZHEN) LTD., Guangdong (CN)

( * ) Notice: Subject to any disclaimer, the term of this patent is extended or adjusted under 35 U.S.C. 154(b) by 306 days.

(21) Appl. No.: 17/996,930

(22) PCT Filed: May 28, 2020

(86) PCT No.: PCT/CN2020/092848
§ 371 (c)(1),
(2) Date: Oct. 22, 2022

(87) PCT Pub. No.: WO2021/212603
PCT Pub. Date: Oct. 28, 2021

(65) Prior Publication Data
US 2023/0168859 A1    Jun. 1, 2023

(30) Foreign Application Priority Data

Apr. 23, 2020 (CN) .......................... 202010325910.2

(51) Int. Cl.
G06F 3/16 (2006.01)
G06F 3/01 (2006.01)
(Continued)

(52) U.S. Cl.
CPC .............. *G06F 3/167* (2013.01); *G06F 3/012* (2013.01); *G06F 3/0487* (2013.01); *G10L 15/22* (2013.01); *G10L 15/24* (2013.01); *G10L 15/26* (2013.01)

(58) Field of Classification Search
CPC .......... G06F 3/167; G06F 3/012; G06F 3/011; G06F 3/04842; G06F 3/04812; G10L 15/22; G10L 15/24; G10L 15/26
See application file for complete search history.

(56) References Cited

U.S. PATENT DOCUMENTS 5,386,494 A * 1/1995 White ..................... G06F 3/167
704/E15.04
9,019,205 B1 4/2015 Lautzenhiser
(Continued)

FOREIGN PATENT DOCUMENTS

CN    103428336 A    12/2013
CN    106126157 A    11/2016
(Continued)

OTHER PUBLICATIONS

Written Opinion of the International Search Authority in international application No. PCT/CN2020/092848, mailed on Jan. 26, 2021.
(Continued)

*Primary Examiner* — Stella L. Woo
(74) *Attorney, Agent, or Firm* — PV IP PC; Wei Te Chung

(57) ABSTRACT

A method for voice input using head control includes: making a head control pointing cursor stay at a position of an input control portion in a voice input interface for a first preset time according to a first head-turning motion of a user; performing speech recognition to generate an input text in a speech conversion result text box; determining whether the head control pointing cursor moves to the speech conversion result text box within a second preset time according to the first head-turning motion; and adding the input text to the input control portion.

18 Claims, 4 Drawing Sheets

(51) Int. Cl.
　　*G06F 3/0487*　　(2013.01)
　　*G10L 15/22*　　(2006.01)
　　*G10L 15/24*　　(2013.01)
　　*G10L 15/26*　　(2006.01)

(56) References Cited

U.S. PATENT DOCUMENTS

| | | | |
|---|---|---|---|
| 2009/0110245 | A1 | 4/2009 | Thorn |
| 2013/0145304 | A1* | 6/2013 | DeLuca .................. G06F 3/013 715/781 |
| 2015/0007114 | A1* | 1/2015 | Poulos .................. G06F 3/0482 715/852 |
| 2015/0153913 | A1 | 6/2015 | Ballard |
| 2015/0187355 | A1* | 7/2015 | Parkinson ............. G06F 40/242 704/235 |
| 2016/0077337 | A1* | 3/2016 | Raffle .................. G02B 27/017 345/156 |
| 2017/0109936 | A1 | 4/2017 | Powderly et al. |
| 2019/0004694 | A1* | 1/2019 | Lu .......................... G06F 3/0304 |
| 2019/0354171 | A1* | 11/2019 | Dai ......................... G06F 3/013 |
| 2019/0369400 | A1* | 12/2019 | Jacobsen ................ G06F 3/011 |

FOREIGN PATENT DOCUMENTS

| | | |
|---|---|---|
| CN | 106168895 A | 11/2016 |
| CN | 106658146 A | 5/2017 |
| CN | 106775555 A | 5/2017 |
| CN | 107436749 A | 12/2017 |
| CN | 107943296 A | 4/2018 |
| CN | 108845754 A | 11/2018 |
| CN | 109471537 A | 3/2019 |
| CN | 109669662 A | 4/2019 |
| CN | 109917982 A | 6/2019 |
| CN | 110785688 A | 2/2020 |
| WO | 2019217081 A1 | 11/2019 |

OTHER PUBLICATIONS

International Search Report in International application No. PCT/CN2020/092848, mailed on Jan. 26, 2021.
1st Office Action issued in corresponding Chinese Patent Application No. 202010325910.2, dated Jan. 25, 2021, pp. 1-11.
Notification to Grant Patent Right for Invention issued in corresponding Chinese Patent Application No. 202010325910.2, dated May 28, 2021, pp. 1-4.
European Search Report in European application No. 20932538.0, mailed on Apr. 19, 2024.

* cited by examiner

METHOD AND DEVICE FOR VOICE INPUT USING HEAD CONTROL DEVICE

CROSS REFERENCE

The present application is a US national phase application based upon an International Application No. PCT/CN2020/092848, filed on May 28, 2020, which claims priority to Chinese Patent Application No. 202010325910.2, titled "METHOD AND DEVICE FOR VOICE INPUT USING HEAD CONTROL", filed on Apr. 23, 2020 with the China National Intellectual Property Administration, which is incorporated by reference in the present application in its entirety.

FIELD OF INVENTION

The present disclosure relates to the technical field of mobile communication, and particularly to a method and a device for voice input using head control.

BACKGROUND

With advancement of science and technology, a new practical technology has been developed in the 20th century, namely virtual reality technology. Virtual reality technology comprises a computer, electronic information, and simulation technology, and its basic implementation is to simulate a virtual environment with a computer to give people a sense of immersion in an environment. With continuous development of social productivity, science, and technology, demand for virtual reality technology is increasing daily in all walks of life, and virtual or augmented reality headsets have also emerged. Virtual or augmented reality headsets are very valuable in many applications, especially personal entertainment. A user can input specific content while wearing a virtual or augmented reality headset. Specifically, the user controls a cursor to move to a text input box with a handle, and then a system pops up a virtual keyboard. The user then moves the cursor on the virtual keyboard with the handle to select a key, thereby inputting a corresponding text. During research and practice of the prior art, the inventor of the present invention found that when a user wears a virtual or augmented reality headset and uses a handle to control a cursor to operate a virtual keyboard for input, such operation is inconvenient and an input efficiency is low.

SUMMARY OF DISCLOSURE

The present disclosure provides a method and a device for voice input using head control, wherein voice input is triggered by turning a user's head to make a cursor stay in an input area, thereby improving efficiency and convenience of input operation.

In a first aspect, the present disclosure provides a method for voice input using head control, comprising:
  making a head control pointing cursor stay at a position of an input control portion in a voice input interface for a first preset time according to a first head-turning motion of a user;
  performing speech recognition to generate an input text in a speech conversion result text box;
  determining whether the head control pointing cursor moves to the speech conversion result text box within a second preset time according to the first head-turning motion; and
  adding the input text to the input control portion.

Optionally, in some embodiments, the making the head control pointing cursor stay at the position of the input control portion in the voice input interface for the first preset time according to the first head-turning motion of the user comprises:
  generating movement information of the head control pointing cursor according to the first head-turning motion;
  moving the head control pointing cursor to the position of the input control portion in the voice input interface according to the movement information; and
  stopping the head control pointing cursor at the position of the input control portion.

Optionally, in some embodiments, the making the head control pointing cursor stay at the position of the input control portion in the voice input interface for the first preset time according to the first head-turning motion of the user comprises:
  if the head control pointing cursor moves out of the position of the input control portion within the first preset time, not performing the speech recognition.

Optionally, in some embodiments, the performing the speech recognition comprises:
  hiding the head control pointing cursor;
  performing the speech recognition;
  sensing a second head-turning motion of the user during the speech recognition; and
  displaying the head control pointing cursor and ending the speech recognition.

Optionally, in some embodiments, the determining whether the head control pointing cursor moves to the speech conversion result text box within the second preset time according to the first head-turning motion comprises:
  if the head control pointing cursor moves to the speech conversion result text box within the second preset time, determining whether the head control pointing cursor stays in the speech conversion result text box for a third preset time according to the first head-turning motion; and
  if the head control pointing cursor does not move to the speech conversion result text box within the second preset time, adding the input text to the input control portion.

Optionally, in some embodiments, the determining whether the head control pointing cursor stays in the speech conversion result text box for the third preset time according to the first head-turning motion comprises:
  if yes, stopping the head control pointing cursor at the position of the input control portion for the first preset time; and
  if not, adding the input text to the input control portion.

In a second aspect, the present disclosure further provides a device for voice input using head control, comprising:
  an interaction unit configured to make a head control pointing cursor stay at a position of an input control portion in a voice input interface for a first preset time according to a first head-turning motion of a user;
  an input text generation unit configured to perform speech recognition to generate an input text in a speech conversion result text box; and
  a processing unit configured to determine whether the head control pointing cursor moves to the speech conversion result text box within a second preset time according to the first head-turning motion and add the input text to the input control portion.

Optionally, in some embodiments, the input text generation unit is further configured to hide the head control pointing cursor before the speech recognition, receive information that the user performs a second head-turning motion during the speech recognition, and display the head control pointing cursor and end the speech recognition after receiving the information.

Optionally, in some embodiments, the processing unit is further configured to determine whether the head control pointing cursor stays in the speech conversion result text box for a third preset time according to the first head-turning motion when the processing unit determines that the head control pointing cursor moves to the speech conversion result text box within the second preset time.

Optionally, in some embodiments, the processing unit is further configured to add the input text to the input control portion when the processing unit determines that the head control pointing cursor does not move to the speech conversion result text box within the second preset time.

The present disclosure provides a method and a device for voice input using head control. The device is integrated into a virtual or augmented reality headset. A user wears the virtual or augmented reality headset. A head control pointing cursor is made to stay at a position of an input control portion in a voice input interface for a first preset time according to a first head-turning motion of the user. Then, speech recognition is triggered. The speech recognition generates an input text from what the user says he wants to input, and displays the input text in a speech conversion result text box. If within a second preset time, according to the first head-turning motion of the user, the head control pointing cursor does not move to the speech conversion result text box, the input text is added to the input control portion to complete input. If within the second preset time, according to the first head-turning motion of the user, the head control pointing cursor moves to the speech conversion result text box, it is determined whether the head control pointing cursor stays in the speech conversion result text box for a third preset time according to the first head-turning motion of the user. If yes, the head control pointing cursor is stopped at the position of the input control portion for the first preset time, the input text is modified, and the voice input is re-executed. If not, the input text is added to the input control portion to complete the input. This method avoids using a handle to control a cursor, also avoids inconvenience of repeated movement in a small area, and improves efficiency and convenience of input operation.

DETAILED DESCRIPTION

The present disclosure provides a method and a device for voice input using head control. The device may be integrated into a virtual reality device. The virtual reality device may be a pair of virtual reality glasses, a virtual or augmented reality headset, a virtual reality chair, or the like.

Figure 1:
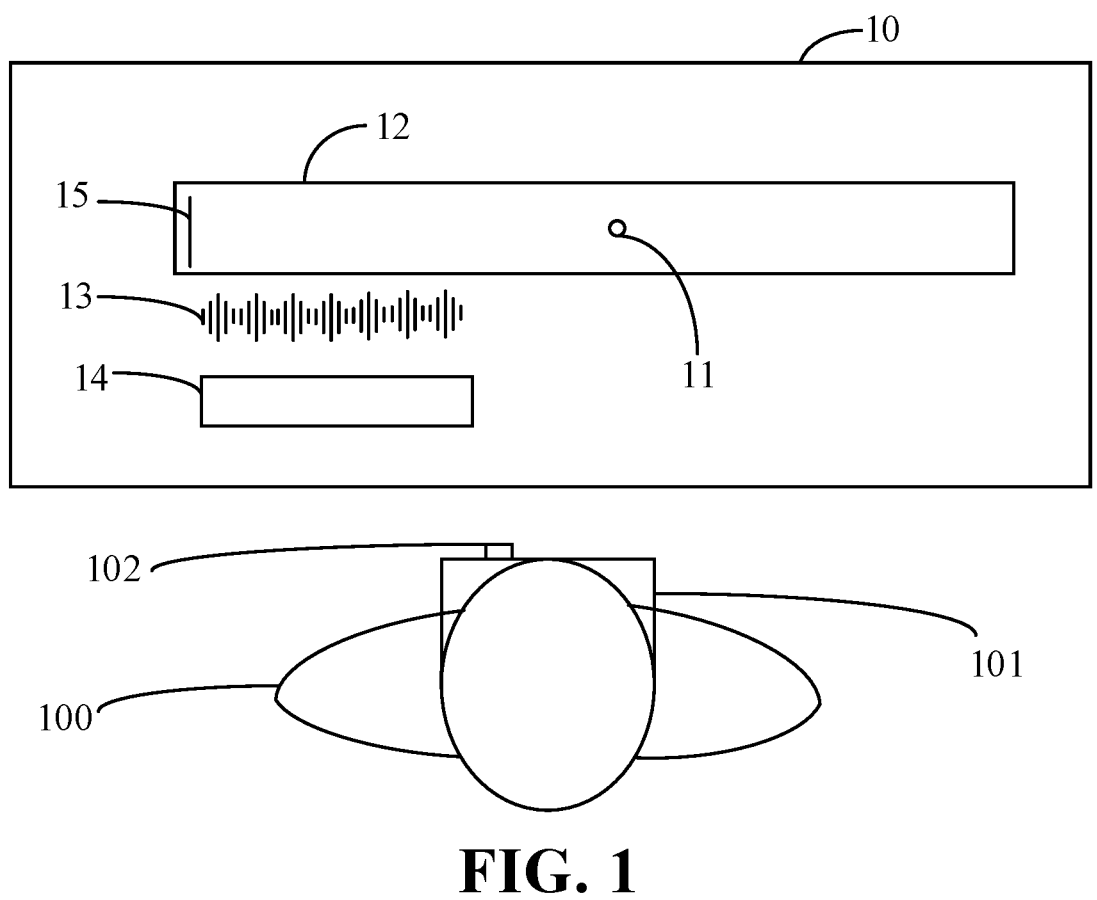
FIG. 1 is a schematic diagram of a scenario in which head control is used for voice input according to an embodiment of the present disclosure.

For example, as shown in FIG. 1, a user 100 wears a virtual or augmented reality headset 101. A voice input interface 10 of a virtual reality scene has a head control pointing cursor 11, an input control portion 12, and an input cursor 15. The user 100 makes a first head-turning motion, such as slightly turning his head up, down, left, or right. An interaction unit 102 in the virtual or augmented reality headset 101 generates movement information of the head control pointing cursor 11 in the voice input interface 10 according to a turning distance and a turning direction of the head of the user 100. The movement information comprises a moving distance and a moving direction of the head control pointing cursor 11 in the voice input interface 10. After the user 100 sees the movement information in the voice input interface 10, the user 100 performs the first head-turning motion again until the head control pointing cursor 11 moves to a position of the input control portion 12 in the voice input interface 10. The user 100 keeps his head still, so that the head control pointing cursor 11 stays at the position of the input control portion 12 in the voice input interface 10 for a first preset time, such as 2 seconds. Then, a voice input prompt animation 13 and a speech conversion result text box 14 appear under the head control pointing cursor 11, the head control pointing cursor 11 is hidden from the voice input interface 10, and a system of the virtual or augmented reality headset 101 starts a voice input service and turns on a microphone. The user 100 performs voice input and speaks a specific content to be input, such as the nearest restaurant. The microphone captures a voice of the user 100. During the voice input, the user 100 makes a second head-turning motion, such as nodding slightly. Then, the head control pointing cursor 11 reappears where it was previously hidden in the voice input interface 10, and the system obtains information of an end of the voice input and ends sound collection. Then, the system performs speech recognition and generates a corresponding input text in the speech conversion result text box 14. If the user 100 makes the first head-turning motion to move the head control pointing cursor 11 to the voice conversion result text box 14 in the voice input interface 10 within a second preset time, such as 2 seconds, and the head control pointing cursor 11 stays in the speech conversion result text box 14 for a third preset time, such as 2 seconds, the user 100 can make modifications to the generated input text. Then, the user 100 makes the first head-turning motion to move the head control pointing cursor 11 to the position of the input control portion 12 again, and performs the voice input again. Otherwise, the corresponding input text generated in the speech conversion result text box 14 is automatically added to the input control portion 12, the input cursor 15 in the input control portion 12 moves to an end of the input control portion 12, and the voice input is completed.

A detailed description will be given below. It should be noted that a description order of the following embodiments is not intended to limit a preferred order of the embodiments.

This embodiment will be described from a perspective of a device for voice input using head control. The device for voice input using head control may be specifically integrated in a virtual reality device. The virtual reality device is a pair of virtual reality glasses, a virtual or augmented reality headset, a virtual reality chair, or the like.

A method for voice input using head control comprises: making a head control pointing cursor stay at a position of an input control portion in a voice input interface for a first preset time according to a first head-turning motion of a user; performing speech recognition to generate an input text in a speech conversion result text box; determining whether the head control pointing cursor moves to the speech conversion result text box within a second preset time according to the first head-turning motion; and adding the input text to the input control portion.

Figure 2:
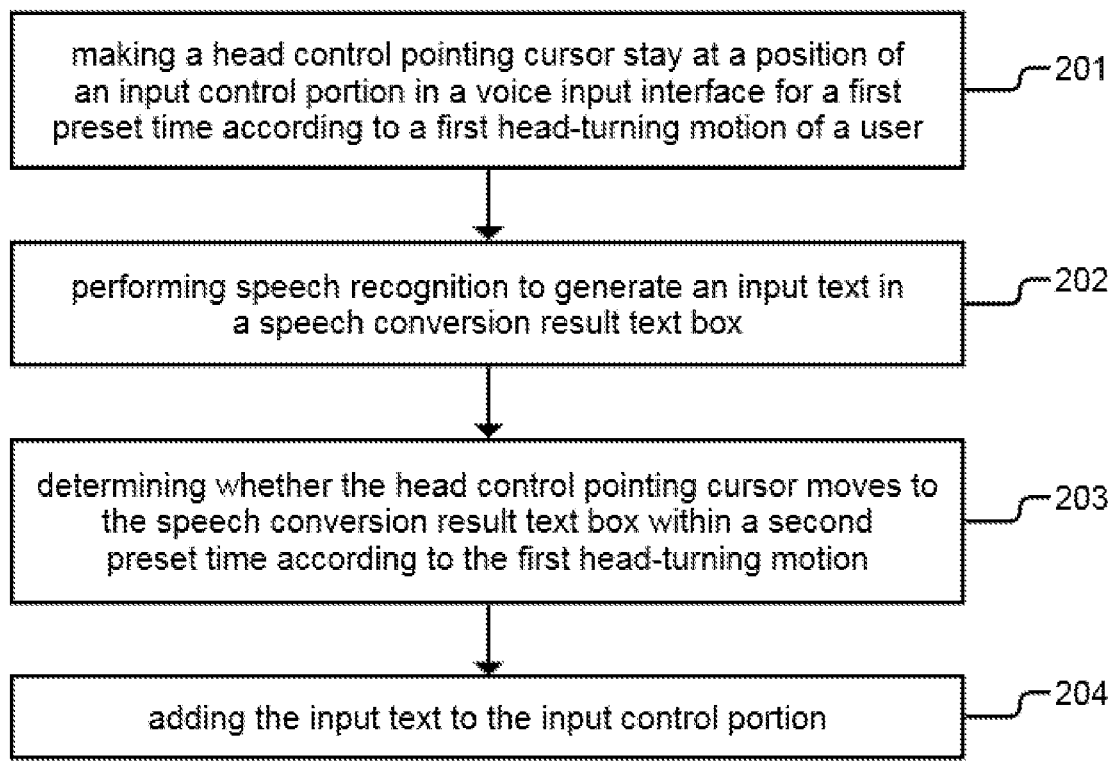
FIG. 2 is a flowchart of a method for voice input using head control according to an embodiment of the present disclosure.

As shown in FIG. 2, a specific flowchart of a method for voice input using head control is as follows.

Step 201: making a head control pointing cursor stay at a position of an input control portion in a voice input interface for a first preset time according to a first head-turning motion of a user.

Figure 3:
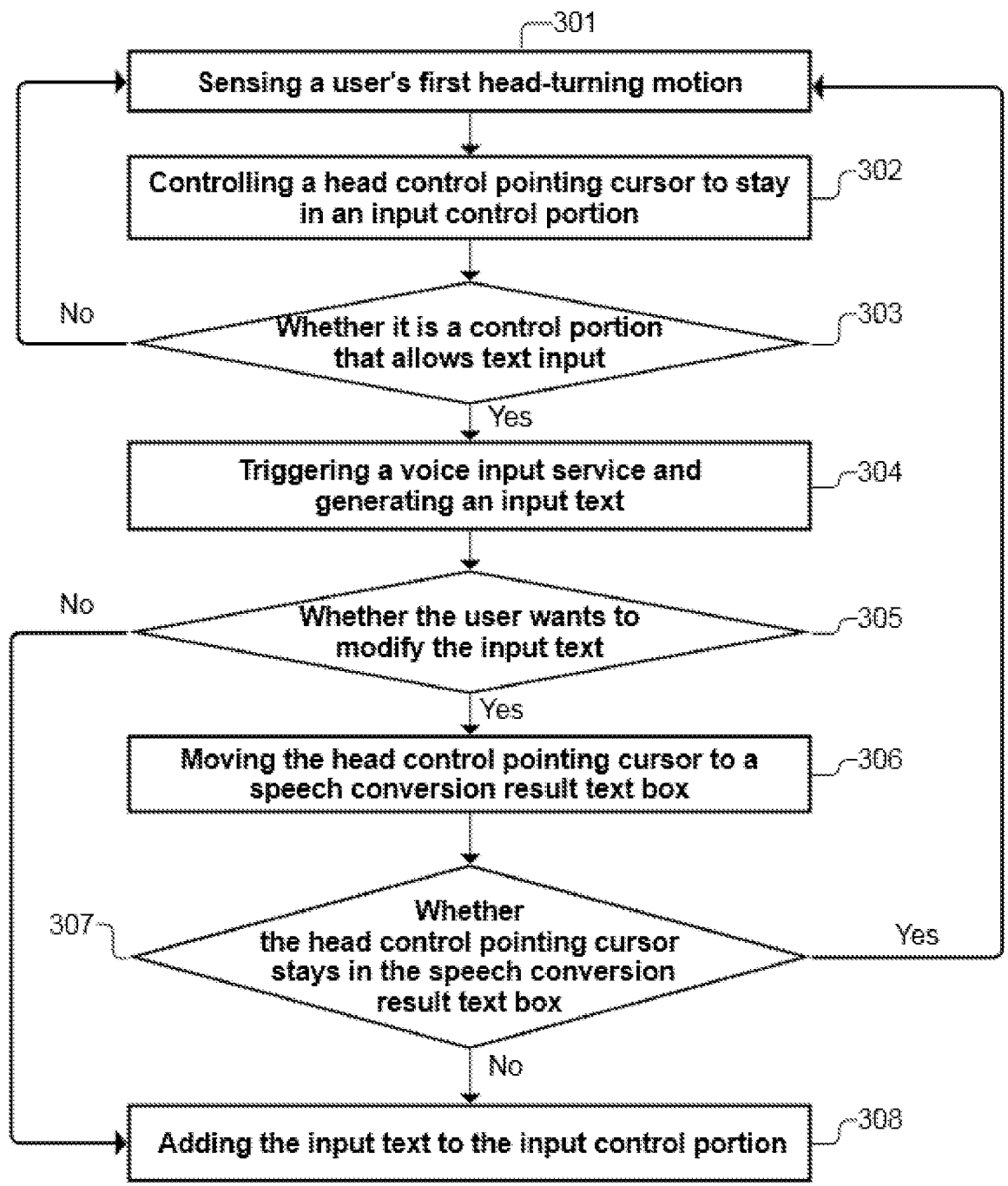
FIG. 3 is another flowchart of a method for voice input using head control according to an embodiment of the present disclosure.

For example, please refer to FIG. 3, a user wears a virtual reality device, and presets a first preset time in a virtual reality scene. In a voice input interface of the virtual reality scene, when the user performs a first head-turning motion, step 301 is performed. That is, a system of the virtual reality device senses the user's head-turning motion, and determines that the head-turning motion is the first head-turning motion. Then, the system obtains movement information of the head control pointing cursor through an algorithm according to a turning distance and a turning direction of the first head-turning motion, and correspondingly displays the movement information of the head control pointing cursor in the voice input interface. Then, step 302 is performed. That is, the user makes the first head-turning motion again according to the movement information seen in the voice input interface until the head control pointing cursor is controlled to move to the input control portion in the voice input interface, and controls the head control pointing cursor to stay in the input control portion for the first preset time. At this time, the voice input interface displays a countdown icon of the first preset time, which intuitively reminds the user of a waiting time of "controlling the head control pointing cursor to stay in the input control portion for the first preset time".

Virtual reality is a combination of virtual and reality. Virtual reality technology is a computer simulation system that can create and experience virtual worlds, and it uses a computer to generate a simulated environment in which the user is immersed. Virtual reality technology generates electronic signals from real-life data through computer technology, and converts the electronic signals into phenomena that can be felt by people through various output devices. These phenomena may be real objects in reality, or substances that we cannot see with naked eyes, and are represented by three-dimensional models.

The movement information refers to a moving distance and a moving direction of the head control pointing cursor in the voice input interface.

Optionally, the first preset time refers to a short time interval, such as 2 seconds. The first preset time cannot be set to an excessively long time interval, which affects the user's experience satisfaction. The first preset time may be flexibly set according to an actual situation.

The first head-turning motion refers to that the user slightly turns his head up, down, left, or right, or turns his head in a circle clockwise or counterclockwise, or slightly nods or shakes his head, or other head movements.

Optionally, the user makes the first head-turning motion until the head control pointing cursor is controlled to move to the input control portion in the voice input interface. The user keeps his head still for the first preset time, so as to control the head control pointing cursor to be still at the input control portion and stay at the input control portion.

Optionally, the user makes the first head-turning motion until the head control pointing cursor is controlled to move to the input control portion in the voice input interface. The user makes the first head-turning motion within the first preset time to control the head control pointing cursor to move in a small range in the input control portion, but does not move out of the input control portion, which indicates that the head control pointing cursor stays in the input control portion for the first preset time.

Optionally, please refer to FIG. 3, after the user makes the first head-turning motion until the head control pointing cursor is controlled to move to the input control portion in the voice input interface, step 303 is executed. That is, the system determines whether the input control portion where the head control pointing cursor is located is a control portion that allows input of text content. If yes, step 304 is executed, that is, a voice input service is triggered, and an input text is generated. If not, step 301 is performed again. That is, the user performs the first head-turning motion again, so as to control the head control pointing cursor to move to another input control portion in the voice input interface until the system determines that the input control portion where the head control pointing cursor is located is a control that allows input of text content. Then, the voice input service is triggered.

Step 202: performing speech recognition to generate an input text in a speech conversion result text box.

For example, please refer to FIG. 3, after the user controls the head control pointing cursor to stay in the input control portion for the first preset time, step 304 is executed. That is, the voice input service of the system is triggered. The system hides the head control pointing cursor in the voice input interface, turns on a microphone, and collects the user's voice until the system senses that the user makes a second head-turning motion, which is a signal from the user to end the voice input. After the system receives the signal from the user to end the voice input, the system ends collection of the user's voice, and makes the head control pointing cursor reappear where it was previously hidden in the voice input interface. Then, the system performs speech recognition on the collected voice, so as to generate an input text, and displays the input text in the speech conversion result text box in the voice input interface.

The second head-turning motion refers to the user nodding or shaking his head in a relatively large range, or turning his head up, down, left, or right in a relatively large range, or other head movements.

The speech recognition is a high technology that enables a machine to convert a speech signal into a corresponding text or command through recognition and understanding.

Step 203: determining whether the head control pointing cursor moves to the speech conversion result text box within a second preset time according to the first head-turning motion.

For example, please refer to FIG. 3, in the virtual reality scene, a second preset time and a third preset time are preset. After the speech conversion result text box in the speech input interface displays the input text to be input, step 305 is executed. That is, it is determined whether the user wants to modify the input text. If yes, go to step 306. That is, the user makes the first head-turning motion to control the head control pointing cursor to move to the speech conversion result text box within the second preset time. At this time, the voice input interface displays a countdown icon of the second preset time, which intuitively reminds the user of duration of the second preset time. Then, step 307 is executed to determine whether the head control pointing cursor stays in the speech conversion result text box for the third preset time. At this time, the voice input interface displays a countdown icon of the third preset time, which intuitively reminds the user of duration of the third preset time. If yes, step 301 is re-executed. The user performs the first head-turning motion until the head control pointing cursor is controlled to move to the position of the input control portion, and the head control pointing cursor stays at the position of the input control portion for the first preset time, so as to re-execute the voice input. After another input text is generated in the speech conversion result text box again, if the user does not need to modify the input text and does not move the head control pointing cursor to the speech conversion result text box within the second preset time, the input text is automatically added to the input control portion, and the voice input is completed.

The second preset time and the third preset time refer to a short time interval, such as 2 seconds. The second preset time and the third preset time cannot be set to an excessively long time interval, which affects the user's experience satisfaction. The second preset time and the third preset time may be flexibly set according to an actual situation. The first preset time, the second preset time, and the third preset time may be same or different from each other, or two of them are same.

Optionally, please refer to FIG. 3, in the virtual reality scene, the second preset time and the third preset time are preset. After the speech conversion result text box in the speech input interface displays the input text to be input, if the user wants to modify the input text, go to step 306. That is, the user performs the first head-turning motion to control the head control pointing cursor to move to the speech conversion result text box within the second preset time. Then, step 307 is performed to determine whether the head control pointing cursor stays in the speech conversion result text box for the third preset time. At this time, the voice input interface displays the countdown icon of the third preset time, which intuitively reminds the user of the duration of the third preset time. If not, that is, the user controls the head control pointing cursor to move out of the speech conversion result text box within the third preset time and does not move the head control pointing cursor back to the speech conversion result text box before an end of the second preset time, the previously generated input text cannot be modified. Then, step 308 is executed to automatically add the input text to the input control portion, and the voice input is completed.

Optionally, please refer to FIG. 3, after the speech conversion result text box in the speech input interface displays the input text to be input, step 305 is executed. That is, it is determined whether the user wants to modify the input text. If no, that is, the user does not move the head control pointing cursor to the speech conversion result text box within the second preset time, step 308 is executed to automatically add the input text to the input control portion, and the voice input is completed.

Step 204: adding the input text to the input control portion.

For example, please refer to FIG. 3, after the speech conversion result text box in the speech input interface displays the input text to be input, and the system determines that the user does not want to modify the input text, step 308 is executed to automatically add the input text to the input control portion. When an input cursor in the input control portion moves to an end of the input control portion, the voice input is completed.

In order to better implement the above method, the present disclosure further provides a device for voice input using head control. The device for voice input using head control may be integrated into a virtual reality device. The virtual reality device may be a pair of virtual reality glasses, a virtual or augmented reality headset, a virtual reality chair, or the like.

Figure 4:
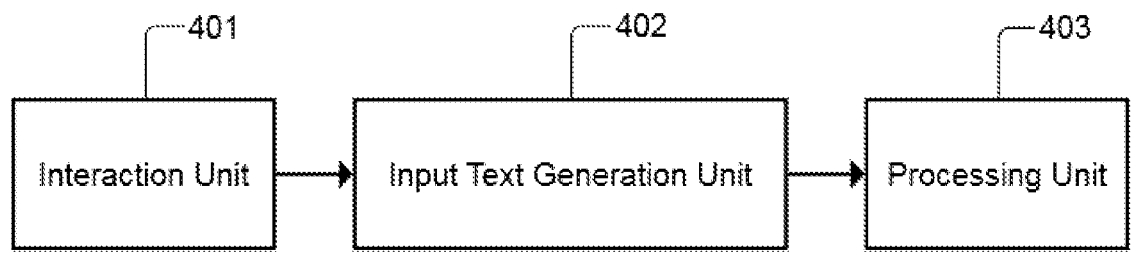
FIG. 4 is a schematic structural diagram of a device for voice input using head control according to an embodiment of the present disclosure.

For example, as shown in FIG. 4, the device for voice input using head control may comprise an interaction unit 401, an input text generation unit 402, and a processing unit 403.

Interaction Unit 401

The interaction unit 401 is configured to make a head control pointing cursor stay at a position of an input control portion in a voice input interface for a first preset time according to a first head-turning motion of a user.

For example, in the voice input interface of the virtual reality scene, the user makes the first head-turning motion. The interaction unit 401 senses the user's head-turning motion, and determines that the head-turning action is the first head-turning action. Then, the interaction unit 401 obtains movement information of the head control pointing cursor through an algorithm according to a turning distance and a turning direction of the first head-turning motion, and correspondingly displays the movement information of the head control pointing cursor in the voice input interface. Therefore, the user can control the head control pointing cursor to move on the voice input interface by turning his head, so as to realize interaction between the user and the virtual reality device. The interaction unit 401 controls the head control pointing cursor to move to the position of the input control portion by recognizing the user's first head-turning motion, and controls the head control pointing cursor to stay at the position of the input control for the first preset time. When the interaction unit 401 determines that the head control pointing cursor moves out of the position of the input control portion within the first preset time, the speech recognition is not performed. When the head control pointing cursor moves to the position of the input control portion, the interaction unit 401 determines whether the input control portion is a control portion that allows the text input. When the interaction unit 401 determines that the input control portion is a control portion that allows the text input, the interaction unit 401 triggers the voice input. When the interaction unit 401 determines that the input control portion is a control portion that does not allow the text input, the interaction unit 401 does not trigger the voice input.

Input Text Generation Unit 402

The input text generation unit 402 is configured to perform speech recognition to generate an input text in a speech conversion result text box.

For example, when the interaction unit 401 recognizes that the user controls the head control pointing cursor to move to the position of the input control portion, and the head control pointing cursor stays at the position of the input control for the first preset time, the interaction unit 401 triggers the voice input service. Then, the input text generation unit 402 hides the head control pointing cursor in the voice input interface, turns on a microphone, and collects the user's voice. The interaction unit 401 senses the user's head-turning motion, and determines that the head-turning action is the second head-turning action. The interaction unit 401 feeds back information that the user makes the second head-turning motion to the input text generation unit 402. After the input text generation unit 402 receives the information, the input text generation unit 402 ends collection of the user's voice, and makes the head control pointing cursor reappear where it was previously hidden in the voice input interface. Then, the input text generation unit 402 performs speech recognition on the collected voice, so as to generate an input text, and displays the input text in the speech conversion result text box in the voice input interface.

Processing Unit 403

The processing unit 403 is configured to determine whether the head control pointing cursor moves to the speech conversion result text box within a second preset time according to the first head-turning motion and add the input text to the input control portion.

For example, the second preset time and the third preset time are preset in the virtual reality scene. After the input text generation unit 402 displays the input text in the speech conversion result text box of the voice input interface, the interaction unit 401 senses the user's head-turning motion and determines that the head-turning motion is the first head-turning motion. Then, the interaction unit 401 controls the head control pointing cursor to move to the speech conversion result text box within the second preset time, and controls the head control pointing cursor to stay in the speech conversion result text box for the third preset time. Then, the processing unit 403 reminds the user to re-execute the voice input. After the interaction unit 401 senses that the user makes the first head-turning motion until the head control pointing cursor moves to the position of the input control portion, and the head control pointing cursor stays at the position of the input control portion for the first preset time, the voice input is re-executed. After the input text generation unit 402 re-executes the speech recognition and generates another input text in the speech conversion result text box again, if the interaction unit 401 does not sense that the user makes the first head-turning motion to move the head control pointing cursor to the speech conversion result text box within the second preset time, the processing unit 403 automatically adds the input text to the input control portion. Then, the processing unit 403 determines that the input cursor in the input control portion is moved to the end of the input control portion, which indicates that the voice input is completed.

Optionally, the second preset time and the third preset time are preset in the virtual reality scene. After the speech conversion result text box of the speech input interface displays the input text to be input, the interaction unit 401 senses that the user makes the first head-turning motion to control the head control pointing cursor to move to the speech conversion result text box within the second preset time. If within the third preset time, the interaction unit 401 senses that "the user controls the head control pointing cursor to move out of the speech conversion result text box, and the head control pointing cursor does not move back to the speech conversion result text box before the end of the second preset time", the processing unit 403 automatically adds the input text to the input control portion. Then, the processing unit 403 determines that the input cursor in the input control portion is moved to the end of the input control portion, which indicates that the voice input is completed.

Optionally, after the speech conversion result text box of the speech input interface displays the input text to be input, if the interaction unit 401 senses that the user does not move the head control pointing cursor to the speech conversion result text box within the second preset time, the processing unit 403 automatically adds the input text to the input control portion. Then, the processing unit 403 determines that the input cursor in the input control portion is moved to the end of the input control portion, which indicates that the voice input is completed.

Specific implementation of the above operations may refer to the foregoing embodiments, and will not be described in detail herein.

The method and the device for voice input using head control provided by the embodiments of the present disclosure are described in detail above. The present disclosure uses specific examples to describe principles and implementations of the present invention. The above description of the embodiments is only for helping to understand solutions and core ideas of the present invention. Furthermore, those skilled in the art may make modifications to the specific embodiments and applications according to ideas of the present invention. In conclusion, the present specification should not be construed as a limitation to the present invention.

What is claimed is:

1. A method for voice input using head control, comprising:
    making a head control pointing cursor stay at a position of an input control portion in a voice input interface for a first preset time according to a first head-turning motion of a user;
    performing speech recognition to generate an input text in a speech conversion result text box;
    determining whether the head control pointing cursor moves to the speech conversion result text box within a second preset time according to the first head-turning motion; and
    adding the input text to the input control portion;
    wherein the determining whether the head control pointing cursor moves to the speech conversion result text box within the second preset time according to the first head-turning motion comprises:
    if the head control pointing cursor moves to the speech conversion result text box within the second preset time, determining whether the head control pointing cursor stays in the speech conversion result text box for a third preset time according to the first head-turning motion; and
    if the head control pointing cursor does not move to the speech conversion result text box within the second preset time, adding the input text to the input control portion.

2. The method according to claim 1, wherein the making the head control pointing cursor stay at the position of the input control portion in the voice input interface for the first preset time according to the first head-turning motion of the user comprises:
    generating movement information of the head control pointing cursor according to the first head-turning motion;
    moving the head control pointing cursor to the position of the input control portion in the voice input interface according to the movement information; and
    stopping the head control pointing cursor at the position of the input control portion.

3. The method according to claim 1, wherein the making the head control pointing cursor stay at the position of the input control portion in the voice input interface for the first preset time according to the first head-turning motion of the user comprises:
    if the head control pointing cursor moves out of the position of the input control portion within the first preset time, not performing the speech recognition.

4. The method according to claim 1, wherein the making the head control pointing cursor stay at the position of the input control portion in the voice input interface for the first preset time according to the first head-turning motion of the user comprises:
  triggering the voice input when the input control portion is a control portion that allows text input; and
  not triggering the voice input when the input control portion is a control portion that does not allow text input.

5. The method according to claim 1, wherein the performing the speech recognition comprises:
  hiding the head control pointing cursor;
  performing the speech recognition;
  sensing a second head-turning motion of the user during the speech recognition; and
  displaying the head control pointing cursor and ending the speech recognition.

6. The method according to claim 1, wherein the determining whether the head control pointing cursor stays in the speech conversion result text box for the third preset time according to the first head-turning motion comprises:
  if yes, stopping the head control pointing cursor at the position of the input control portion for the first preset time; and
  if not, adding the input text to the input control portion.

7. The method according to claim 1, wherein the adding the input text to the input control portion comprises:
  moving a cursor in the input control portion to an end of the input control portion.

8. The method according to claim 1, wherein the first preset time, the second preset time, and the third preset time are same or different, or two of them are same.

9. A device for voice input using head control, comprising:
  an interaction unit configured to make a head control pointing cursor stay at a position of an input control portion in a voice input interface for a first preset time according to a first head-turning motion of a user;
  an input text generation unit configured to perform speech recognition to generate an input text in a speech conversion result text box; and
  a processing unit configured to determine whether the head control pointing cursor moves to the speech conversion result text box within a second preset time according to the first head-turning motion and add the input text to the input control portion;
  wherein the processing unit is further configured to determine whether the head control pointing cursor stays in the speech conversion result text box for a third preset time according to the first head-turning motion when the processing unit determines that the head control pointing cursor moves to the speech conversion result text box within the second preset time.

10. The device according to claim 9, wherein the interaction unit is further configured to generate movement information of the head control pointing cursor according to the first head-turning motion, move the head control pointing cursor to the position of the input control portion in the voice input interface according to the movement information, and stop the head control pointing cursor at the position of the input control portion.

11. The device according to claim 9, wherein when the interaction unit determines that the head control pointing cursor moves out of the position of the input control portion within the first preset time, the speech recognition is not performed.

12. The device according to claim 9, wherein the interaction unit is configured to trigger the voice input when the interaction unit determines that the input control portion is a control portion that allows text input.

13. The device according to claim 9, wherein the interaction unit is configured to not trigger the voice input when the interaction unit determines that the input control portion is a control portion that does not allow text input.

14. The device according to claim 9, wherein the input text generation unit is further configured to hide the head control pointing cursor before the speech recognition, receive information that the user performs a second head-turning motion during the speech recognition, and display the head control pointing cursor and end the speech recognition after receiving the information.

15. The device according to claim 9, wherein the processing unit is further configured to issue a reminder and make the interaction unit keep the head control pointing cursor at the position of the input control portion for the first preset time when the processing unit determines that the head control pointing cursor stays in the speech conversion result text box for the third preset time according to the first head-turning motion.

16. The device according to claim 9, wherein the processing unit is further configured to add the input text to the input control portion when the processing unit determines that the head control pointing cursor moves out of the speech conversion result text box within the third preset time according to the first head-turning motion.

17. The device according to claim 9, wherein the processing unit is further configured to add the input text to the input control portion when the processing unit determines that the head control pointing cursor does not move to the speech conversion result text box within the second preset time.

18. The device according to claim 9, wherein the processing unit is further configured to move a cursor in the input control portion to an end of the input control portion when the processing unit determines that the input text is added to the input control portion.

* * * * *